United States Patent
Hashimoto et al.

(10) Patent No.: US 7,404,380 B2
(45) Date of Patent: Jul. 29, 2008

(54) METHOD OF CONTROLLING COMPRESSION-IGNITION INTERNAL COMBUSTION ENGINE

(75) Inventors: Kohtaro Hashimoto, Wako (JP); Takahiro Gunji, Wako (JP); Kohjiroh Aimoto, Wako (JP); Fumiaki Ikegawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 108 days.

(21) Appl. No.: 11/578,151

(22) PCT Filed: Oct. 26, 2005

(86) PCT No.: PCT/JP2005/019720

§ 371 (c)(1),
(2), (4) Date: Oct. 11, 2006

(87) PCT Pub. No.: WO2006/049063

PCT Pub. Date: May 11, 2006

(65) Prior Publication Data

US 2007/0219701 A1 Sep. 20, 2007

(30) Foreign Application Priority Data

Nov. 4, 2004 (JP) .............................. 2004-320106

(51) Int. Cl.
*F02B 47/02* (2006.01)

(52) U.S. Cl. ...................... 123/1 A; 123/25 R; 123/575

(58) Field of Classification Search ................ 123/1 A, 123/25 R, 25 B, 25 C, 25 A, 25 E, 198 A, 123/27 R, 575, 3; 701/103

See application file for complete search history.

(56) References Cited

U.S. PATENT DOCUMENTS

| 4,031,864 | A  | * | 6/1977 | Crothers ..................... 123/1 A |
| 4,403,576 | A  | * | 9/1983 | Dimitroff et al. ............... 123/3 |
| 4,993,386 | A  | * | 2/1991 | Ozasa et al. ................ 123/25 J |
| 6,843,208 | B2 | * | 1/2005 | Tamura et al. ............. 123/27 R |
| 7,017,530 | B2 | * | 3/2006 | Hashimoto et al. .......... 123/1 A |
| 7,165,512 | B2 | * | 1/2007 | Hashimoto et al. ............. 123/3 |
| 7,225,787 | B2 | * | 6/2007 | Bromberg et al. ....... 123/198 A |

(Continued)

FOREIGN PATENT DOCUMENTS

JP          6-280696 A       10/1994

(Continued)

*Primary Examiner*—Stephen K. Cronin
*Assistant Examiner*—Hyder Ali
(74) *Attorney, Agent, or Firm*—Birch, Stewart, Kolasch & Birch, LLP

(57) ABSTRACT

There is provided a control method of a compression-ignition internal combustion engine capable of easily coping with a wide range of required loads by a single fuel.

A compression-ignition internal combustion engine includes a first tank (2) for storing a blended fuel that contains alcohol and liquid hydrocarbon at predetermined percentages and a second tank (4) for mixing the blended fuel supplied from the first tank (2) with water and storing a liquid mixture of the water and the alcohol mixed with each other and the liquid hydrocarbon with the liquid mixture and the liquid hydrocarbon separated from each other, and a supply of the blended fuel stored in the first tank (2) and a supply of the liquid hydrocarbon stored in the second tank (4) are varied according to a required load of the compression-ignition internal combustion engine (1).

10 Claims, 2 Drawing Sheets

U.S. PATENT DOCUMENTS

| | | | |
|---|---|---|---|
| 7,261,065 B2 * | 8/2007 | Aimoto et al. | 123/3 |
| 7,290,505 B2 * | 11/2007 | Kamio et al. | 123/1 A |
| 7,320,297 B2 * | 1/2008 | Kamio et al. | 123/1 A |

FOREIGN PATENT DOCUMENTS

| | | |
|---|---|---|
| JP | 10-252572 A | 9/1998 |
| JP | 2000-213444 A | 2/2000 |
| JP | 2000-204990 A | 7/2000 |
| JP | 2001-355471 A | 12/2001 |
| JP | 2002-357139 A | 12/2002 |
| JP | 2003-286848 A | 10/2003 |

* cited by examiner

METHOD OF CONTROLLING COMPRESSION-IGNITION INTERNAL COMBUSTION ENGINE

TECHNICAL FIELD

The present invention relates to a method of controlling a compression-ignition internal combustion engine.

BACKGROUND ART

In recent years, consideration has been given to a compression-ignition internal combustion engine typified by a homogeneous charge compression ignition engine in order to improve fuel consumption of internal combustion engines and to reduce emission. The compression-ignition internal combustion engine leads an oxygen containing gas and a fuel capable of compressed self-ignition into a cylinder and compressing the same for self-ignition.

It is, however, hard to control the ignition timing of the compression-ignition internal combustion engine, unlike a spark-ignition internal combustion engine. In addition, the compression-ignition internal combustion engine is susceptible to knocking in high required load of the compression-ignition internal combustion engine if a fuel of high ignitability is used and is susceptible to misfire in low required load of the compression-ignition internal combustion engine if a fuel of low ignitability is used. Therefore, the compression-ignition internal combustion engine has a problem of a narrow stable operating range.

To resolve the above problems, there is a conventionally known technology for supplying the compression-ignition internal combustion engine with a mixture of a fuel of high ignitability and a fuel of low ignitability provided therein (for example, refer to Japanese Patent Laid-Open No. 2001-355471). According to this technology, a stable operation is achieved in a wide range of required loads by adjusting the mixture ratio of the above fuels corresponding to the required load of the compression-ignition internal combustion engine. In this technology, however, the fuel of high ignitability and the fuel of low ignitability need be prepared individually and stored separately from each other.

On the other hand, there is also a known technology for using a single fuel to generate a ignitability suppressive substance by partially oxidizing a part of the fuel in the case of an increase in the required load of the compression-ignition internal combustion engine (for example, refer to Japanese Patent Laid-Open No. 2000-213444). Specifically, the technology is for use in generating a ignitability suppressive substance such as formaldehyde by partially oxidizing a part of hydrocarbon fuel such as light oil.

The technology, however, has a problem of requiring a high-temperature and long-term reaction to generate formaldehyde by partially oxidizing the hydrocarbon such as light oil.

DISCLOSURE OF THE INVENTION

Problems to be Solved by the Invention

It is an object of the present invention to resolve the above problem and to provide a method of controlling a compression-ignition internal combustion engine capable of easily coping with a wide range of required loads with a single fuel.

Means for Solving the Problems

To achieve the above object, according to one aspect of the present invention, there is provided a method of controlling a compression-ignition internal combustion engine for leading an oxygen containing gas and a fuel capable of compressed self-ignition into a cylinder and for compressing the same for self-ignition, wherein a supply of the blended fuel stored in the first tank and a supply of the liquid hydrocarbon stored in the second tank are varied according to a required load of the compression-ignition internal combustion engine, wherein a first tank is for storing a blended fuel that contains alcohol and liquid hydrocarbon at predetermined percentages; and a second tank is for mixing the water into the blended fuel supplied from the first tank and for storing the liquid mixture and the liquid hydrocarbon in mutually separated condition.

According to the present invention, the first tank stores the blended fuel that contains the alcohol and the liquid hydrocarbon, both of which are capable of compressed self-ignition. The blended fuel is relatively low in ignitability since the alcohol lower in ignitability than the liquid hydrocarbon is added to the liquid hydrocarbon.

As an example of the alcohol here, there is, for example, methanol, ethanol, or propanol, which is alcohol having a carbon number of alkyl group of 3 or lower. In addition, as an example of the liquid hydrocarbon, there is, for example, a straight-chain saturated hydrocarbon such as heptane, a branched-chain saturated hydrocarbon such as iso-octane, an unsaturated hydrocarbon such as 1-hexene, an alicyclic hydrocarbon such as cyclohexane, an aromatic hydrocarbon such as toluene, and a mixture of these liquid hydrocarbons such as gasoline or light oil.

Furthermore, the second tank stores the mixture that contains the blended fuel supplied from the first tank and the water mixed therewith. In this mixture, only the alcohol in the blended fuel dissolves in the water and the liquid mixture is then formed because the liquid hydrocarbon is substantially insoluble in water and the alcohol is readily-soluble in water. Thereafter, since the liquid mixture differs in specific gravity from the liquid hydrocarbon, the liquid mixture and the liquid hydrocarbon separate in two layers of the liquid mixture and the liquid hydrocarbon by gravitational force. In this case, for example, if ethanol is used as the alcohol and gasoline is used as the liquid hydrocarbon, the liquid hydrocarbon is in the upper layer and the liquid mixture is in the lower layer since the specific gravity of the liquid hydrocarbon is lower than that of the liquid mixture. This separation occurs due to the difference in specific gravity and therefore they are rapidly separated from each other at room temperature. The separated liquid hydrocarbon does not include alcohol of low ignitability any more and thus is a fuel of higher ignitability than the blended fuel. Therefore, two types of fuels different in ignitability can be easily obtained from a single fuel.

Moreover, it is possible to stably operate the compression-ignition internal combustion engine by varying the supply of the blended fuel in the first tank and the supply of the liquid hydrocarbon in the second tank according to the required load of the compression-ignition internal combustion engine.

Therefore, according to the present invention, it is possible to easily cope with a wide range of required loads by means of a single fuel.

Furthermore, according to the present invention, it is preferable to supply a fuel in such a way that the fuel has optimum ignitability according to the required load of the compression-ignition internal combustion engine in order to stably operate the compression-ignition internal combustion engine.

In the control method of the present invention, for example, the blended fuel of low ignitability stored in the first tank is supplied to the compression-ignition internal combustion engine if the required load of the compression-ignition internal combustion engine is higher than a predetermined value, and the liquid hydrocarbon of high ignitability stored in the second tank is supplied to the compression-ignition internal combustion engine if the required load of the compression-ignition internal combustion engine is equal to or lower than the predetermined value.

Furthermore, in the control method of the present invention, the supply of the blended fuel stored in the first tank and the supply of the liquid hydrocarbon stored in the second tank can be varied respectively in such a way that the proportion of the blended fuel increases in the total fuel supplied to the compression-ignition internal combustion engine with an increase in the required load of the compression-ignition internal combustion engine, and the supply of the blended fuel stored in the first tank and the supply of the liquid hydrocarbon stored in the second tank can be varied respectively in such a way that the proportion of the liquid hydrocarbon increases in the total fuel supplied to the compression-ignition internal combustion engine with a decrease in the required load of the compression-ignition internal combustion engine.

According to one of the above methods, no knocking occurs even in the case of an increase in the required load of the compression-ignition internal combustion engine and no misfire occurs even in the case of a decrease in the required load of the compression-ignition internal combustion engine. Therefore, it is possible to stably operate the compression-ignition internal combustion engine.

Furthermore, in the present invention, preferably the liquid mixture stored in the second tank is supplied to the compression-ignition internal combustion engine together with the blended fuel stored in the first tank or the liquid hydrocarbon stored in the second tank in the case of an increase in the required load of the compression-ignition internal combustion engine.

According to this, the liquid mixture of the water and the alcohol is supplied to the compression-ignition internal combustion engine in the case of an increase in the required load of the compression-ignition internal combustion engine. Therefore, the alcohol of low ignitability can suppress knocking. Furthermore, the water included in the liquid mixture decreases the combustion temperature, and therefore it is possible to suppress knocking and generation of NOx.

There is a known technology for simply emitting a water jet into a cylinder of an internal combustion engine in order to decrease a combustion temperature of the internal combustion engine (for example, refer to Japanese Patent Laid-Open No. Hei 10-252572 or Japanese Patent Laid-Open No. 2000-204990).

BEST MODE FOR CARRYING OUT THE INVENTION

One embodiment of the present invention will be described below by using the accompanying drawings. FIG. 1 shows a block diagram illustrating a control method of this embodiment. FIG. 2 shows a graph illustrating an example of a relation between a required load of a compression-ignition internal combustion engine and a supply of a fuel to a cylinder in the control method of this embodiment.

The control method of this embodiment can be performed by the compression-ignition internal combustion engine 1 shown in FIG. 1. The compression-ignition internal combustion engine 1 includes a first fuel tank 2 for storing a blended fuel that contains alcohol and liquid hydrocarbon mixed with each other, a water tank 3 for storing water, a second fuel tank 4 for mixing the blended fuel supplied from the first fuel tank 2 with the water supplied from the water tank 3 and storing the mixture, and a cylinder 5 for compressing the fuels supplied from the first fuel tank 2 and from the second fuel tank 4 to self-ignite the fuels.

The first fuel tank 2 is connected to the second fuel tank 4 via a flow regulating valve 7 through a supply pipe 6 to supply the blended fuel to the second fuel tank 4. The supply pipe 6 is connected to a lower portion of the second fuel tank 4. The first fuel tank 2 is connected to the cylinder 5 via a flow regulating valve 9 through a supply pipe 8 to supply the blended fuel to the cylinder 5.

The water tank 3 is connected to the second fuel tank 4 via a flow regulating valve 11 through a supply pipe 10 to supply the water to the second fuel tank 4. The supply pipe 10 is connected to an upper portion of the second fuel tank 4.

The second fuel tank 4 is connected to the cylinder 5 via a flow regulating valve 13 through a supply pipe 12. The supply pipe 12 is connected to the upper portion of the second fuel tank 4, spaced apart from the supply pipe 10. The second fuel tank 4 is connected to the cylinder 5 via a flow regulating valve 15 through a supply pipe 14. The supply pipe 14 is connected to the lower portion of the second fuel tank 4, spaced apart from the supply pipe 6.

Subsequently, the control method of this embodiment will be described below.

First, according to the control method of this embodiment, the flow regulating valve 7 is opened at a predetermined opening to supply the blended fuel of alcohol and liquid hydrocarbon stored in the first fuel tank 2 to the second fuel tank 4 through the supply pipe 6. At the same time, according to the control method of this embodiment, the flow regulating valve 11 is opened at a predetermined opening corresponding to the opening of the flow regulating valve 7 to supply the water stored in the water tank 3 to the second fuel tank 4 through the supply pipe 10. Thereby, the blended fuel supplied from the first fuel tank 2 is mixed with the water supplied from the water tank 3 and then they are divided into a liquid mixture of water and alcohol and liquid hydrocarbon.

Note here that the blended fuel contains alcohol and liquid hydrocarbon at predetermined percentages (for example, 20 weight percents of alcohol and 80 weight percents of liquid hydrocarbon). Regarding the liquid hydrocarbon, it is preferable to use liquid hydrocarbon of higher ignitability such as a straight-chain saturated hydrocarbon. The use of the liquid hydrocarbon of higher ignitability increases a difference between the ignitability of the blended fuel mixed with the alcohol of low ignitability and the ignitability of only the liquid hydrocarbon separated from the other, thereby achieving a wider range of variations in the ignitability. As an example of the liquid hydrocarbon, there is, for example, heptane ($C_7H_{16}$).

Regarding the alcohol, it is preferable to use alcohol more readily soluble in water such as having a carbon number of alkyl group of 3 or lower. The use of the more readily soluble alcohol enables the alcohol and the liquid hydrocarbon in the blended fuel to be easily separated from each other by addition of water. As an example of the alcohol, there is, for example, ethanol ($C_2H_5OH$).

The ethanol is obtained by fermentation and distillation of a plant substance such as, for example, sugar cane, corn, or other farm crops. The plant substance itself as a raw material, however, has already absorbed carbon dioxide. Therefore, it has a so-called carbon neutral effect such that the amount of emitted carbon dioxide equals the amount of carbon dioxide absorbed by the plant itself even if the plant substance is burned and therefore the amount of emission of the carbon dioxide in total is theoretically zero. Accordingly, it is preferable to use the blended fuel that contains the ethanol for the compression-ignition internal combustion engine 1.

Furthermore, if the water is supplied to the second fuel tank 4 from the upper portion thereof and the blended fuel is supplied to the second fuel tank 4 from the lower portion thereof, the water goes down and the blended fuel goes up since the water is higher in specific gravity than the blended fuel and therefore the water and the blended fuel are naturally mixed with each other.

The liquid hydrocarbon is substantially insoluble in water and the alcohol is readily soluble in water. Therefore, at that time only the alcohol in the blended fuel dissolves in the water and thereby a liquid mixture is formed, by which they are divided into two layers of the liquid hydrocarbon and the liquid mixture. For example, if ethanol is used as the alcohol and gasoline is used as the liquid hydrocarbon here, the specific gravity of the liquid hydrocarbon is lower than that of the liquid mixture and therefore the liquid hydrocarbon is in the upper layer and the liquid mixture is in the lower layer. This separation occurs due to the difference in specific gravity and therefore they are rapidly separated from each other at room temperature. The separated liquid hydrocarbon does not include alcohol of low ignitability any more and thus it is a fuel of higher ignitability than the blended fuel. Therefore, two types of fuels different in ignitability can be easily obtained from a single fuel.

The water is supplied to become at a predetermined percentage relative to the blended fuel supplied to the second fuel tank 4 that facilitates the separation between the alcohol and the liquid hydrocarbon in the blended fuel (for example, 3 weight percents of the blended fuel supplied to the second fuel tank 4).

Subsequently, according to the control method of this embodiment, the flow regulating valve 13 is opened at a predetermined opening according to the size of the required load of the compression-ignition internal combustion engine 1 to supply the liquid hydrocarbon separated in the upper layer in the second fuel tank 4 to the cylinder 5 through the supply pipe 12. At the same time, according to the control method of this embodiment, the flow regulating valve 9 is opened at a predetermined opening corresponding to the opening of the flow regulating valve 13 to supply the blended fuel stored in the first fuel tank 2 to the cylinder 5 through the supply pipe 8.

At this point, according to the control method of this embodiment, the openings of the flow regulating valves 13 and 9 are adjusted to appropriately control the ratio between the fuel of high ignitability supplied from the supply pipe 12 to the cylinder 5 and the fuel of low ignitability supplied from the supply pipe 8 to the cylinder 5. For example, according to the control method of this embodiment, the openings are adjusted in such a way that the ratio of the blended fuel increases with an increase in the required load of the compression-ignition internal combustion engine 1, while they are adjusted in such a way that the ratio of the liquid hydrocarbon increases with a decrease in the required load of the compression-ignition internal combustion engine 1.

An example of the above processing will be described by using the graph shown in FIG. 2. Referring to FIG. 2, there is shown a graph illustrating an example of a relation between the required load of the compression-ignition internal combustion engine 1 and the supply of the fuel to the cylinder 5, with the axis of ordinate representing the supply of the fuel and the axis of abscissa representing a brake mean effective pressure. The brake mean effective pressure is a value equivalent to the required load of the compression-ignition internal combustion engine 1. The brake mean effective pressure is shown as a pressure with a value obtained by calculating a work from a brake torque of the compression-ignition internal combustion engine 1 and then dividing the work by the volume of the cylinder 5 of the compression-ignition internal combustion engine 1. FIG. 2 shows the transition of the total fuel supply to the cylinder 5 and shows the supplies of the liquid mixture, the liquid hydrocarbon, and the blended fuel contained in the total fuel, respectively.

As shown in FIG. 2, first, during the period in which the brake mean effective pressure as a required load increases from 0 MPa to 0.2 MPa, only the liquid hydrocarbon is supplied and the supply increases with the increase in the brake mean effective pressure. Subsequently, during the period in which the brake mean effective pressure increases from 0.2 MPa to 0.8 MPa, the liquid hydrocarbon and the blended fuel are supplied. In this condition, the total fuel supply increases with the increase in the brake mean effective pressure. On the other hand, the supply of the liquid hydrocarbon decreases with the increase in the brake mean effective pressure. When the brake mean effective pressure reaches 0.8 MPa, the supply of the liquid hydrocarbon becomes zero. In other words, only the blended fuel will be supplied.

Thereby, the ignitability of the fuel supplied to the cylinder 5 can be appropriately adjusted according to the size of the required load of the compression-ignition internal combustion engine 1. Therefore, the compression-ignition internal combustion engine 1 can stably be operated without misfire and knocking.

Furthermore, according to the control method of this embodiment, if the required load of the compression-ignition internal combustion engine 1 further increases to exceed a predetermined value beyond which knocking occurs with only the blended fuel supplied (for example, 0.8 MPa of brake mean effective pressure in FIG. 2), the flow regulating valve 9 is opened at a predetermined opening to supply the blended fuel to the cylinder 5 and further the flow regulating valve 15 is opened at a predetermined opening corresponding to the opening of the flow regulating valve 9 to supply the liquid mixture of the water and the alcohol separated as the lower layer in the second fuel tank 4 to the cylinder 5 through the supply pipe 14.

According to the control method of this embodiment, the predetermined value can be a value beyond which knocking occurs with only the liquid hydrocarbon or the blended fuel supplied in the condition where the liquid hydrocarbon or the blended fuel is supplied (for example, in the state of brake mean effective pressure less than 0.8 MPa in FIG. 2). At this point, according to the control method of this embodiment, if the required load of the compression-ignition internal combustion engine 1 exceeds the predetermined value, the flow regulating valve 9, 13 is opened at a predetermined opening to supply the liquid hydrocarbon or the blended fuel to the cylinder 5 and further the flow regulating valve 15 is opened at a predetermined opening corresponding to the opening of the flow regulating valve 9, 13 to supply the liquid mixture of the water and the alcohol separated as the lower layer in the second fuel tank 4 to the cylinder 5 through the supply pipe 14.

Thereby, the liquid mixture of the water and the alcohol is supplied when the required load of the compression-ignition internal combustion engine 1 further increases, by which knocking can be suppressed by the alcohol of low ignitability. In addition, the water included in the liquid mixture decreases the combustion temperature, by which both of knocking and generation of NOx can be suppressed.

The liquid mixture is supplied preferably in such a way as to be 5 to 50 weight percents of the total fuel supplied to the cylinder 5.

For example, as shown in FIG. 2, if the brake mean effective pressure exceeds 0.8 MPa, the blended fuel is supplied to the cylinder 5 and the liquid mixture is supplied, too. During an increase in the brake mean effective pressure from 0.8 MPa to 1.2 MPa, which is the maximum brake mean effective pressure of the compression-ignition internal combustion engine 1, the total fuel supply increases with the increase in the brake mean effective pressure. In this condition, the supply of the liquid mixture increases with the increase in the brake mean effective pressure. The liquid mixture is effective for suppressing knocking when the proportion of the supply of the liquid mixture exceeds 5 weight percents of the total fuel supply and it is supplied with 50 weight percents as an upper limit.

Although the liquid hydrocarbon and the blended fuel are adjusted so as to be of predetermined percentages according to the size of the required load of the compression-ignition internal combustion engine 1 before they are supplied to the cylinder 5 in this embodiment, it is also possible to supply only one of the liquid hydrocarbon and the blended fuel to the cylinder 5 according to the size of the required load of the compression-ignition internal combustion engine 1 as an alternative embodiment. For example, according to the control method of the alternative embodiment, only the liquid hydrocarbon stored in the second fuel tank 4 is supplied to the cylinder 5 if the required load of the compression-ignition internal combustion engine 1 does not exceed the predetermined value beyond which a stable operation is impossible with only the supply of the liquid hydrocarbon, while only the blended fuel stored in the first fuel tank 2 is supplied to the cylinder 5 if the required load of the compression-ignition internal combustion engine 1 exceeds the predetermined value.

DESCRIPTION OF NUMERALS

Figure 1:
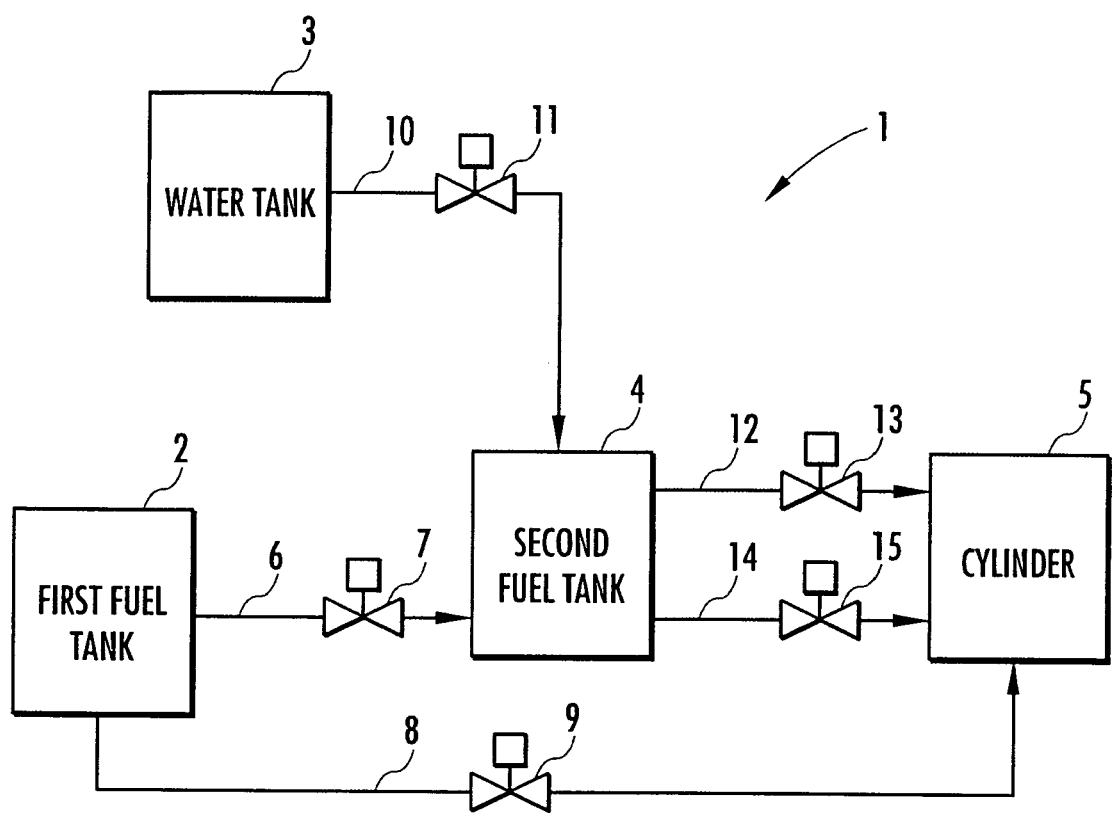
FIG. 1 is a block diagram showing a configuration related to a control method of a compression-ignition internal combustion engine according to an embodiment of the present invention.
Figure 2:
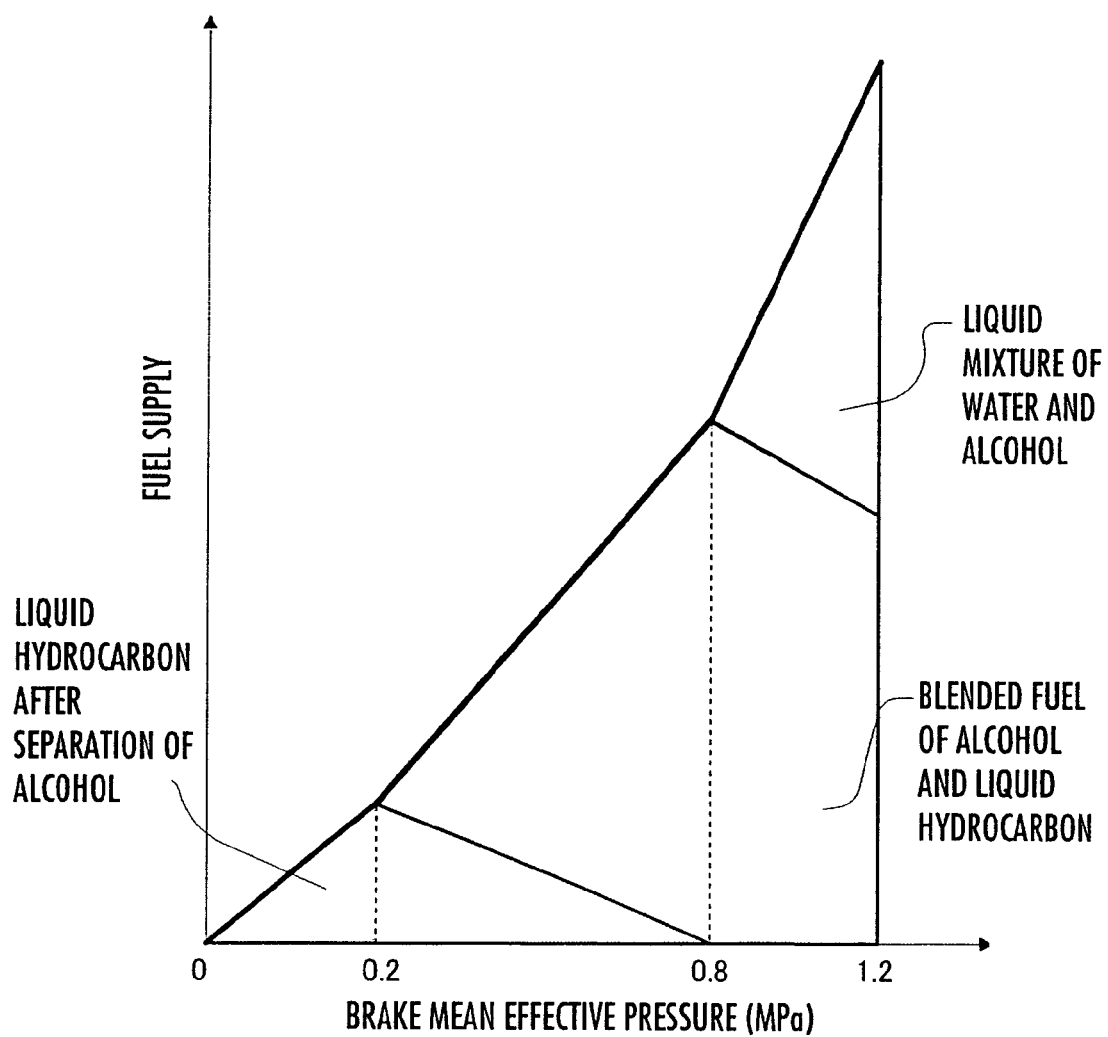
FIG. 2 is a graph showing an example of a relation between a required load of the compression-ignition internal combustion engine and a supply of a fuel to a cylinder.

1 . . . compression-ignition internal combustion engine; 2 . . . first fuel tank; 3 . . . water tank; 4 . . . second fuel tank; 5 . . . cylinder; 6, 8, 10, 12, 14 . . . supply pipe; 7, 9, 11, 13, 15 . . . flow regulating valve

The invention claimed is:

1. A method of controlling a compression-ignition internal combustion engine for leading an oxygen containing gas and a fuel enabling compressed self-ignition into a cylinder and for compressing the same for self-ignition,
wherein a supply of a blended fuel stored in a first tank and a supply of a liquid hydrocarbon stored in a second tank are varied according to a required load of the compression-ignition internal combustion engine,
wherein the first tank is for storing the blended fuel that contains alcohol and liquid hydrocarbon at predetermined percentages; and
the second tank is for mixing the water into the blended fuel supplied from the first tank and for storing the liquid mixture and the liquid hydrocarbon in mutually separated condition.

2. A method of controlling a compression-ignition internal combustion engine according to claim 1, wherein:
the blended fuel stored in the first tank is supplied to the compression-ignition internal combustion engine if the required load of the compression-ignition internal combustion engine is higher than a predetermined value; and
the liquid hydrocarbon stored in the second tank is supplied to the compression-ignition internal combustion engine if the required load of the compression-ignition internal combustion engine is equal to or lower than the predetermined value.

3. A method of controlling a compression-ignition internal combustion engine according to claim 1, wherein:
the supply of the blended fuel stored in the first tank and the supply of the liquid hydrocarbon stored in the second tank are varied in such a way that the proportion of the blended fuel increases in the total fuel supplied to the compression-ignition internal combustion engine with an increase in the required load of the compression-ignition internal combustion engine; and
the supply of the blended fuel stored in the first tank and the supply of the liquid hydrocarbon stored in the second tank are varied respectively in such a way that the proportion of the liquid hydrocarbon increases in the total fuel supplied to the compression-ignition internal combustion engine with a decrease in the required load of the compression-ignition internal combustion engine.

4. A method of controlling a compression-ignition internal combustion engine according to claim 1, wherein the liquid mixture stored in the second tank is supplied to the compression-ignition internal combustion engine together with the blended fuel stored in the first tank or the liquid hydrocarbon stored in the second tank in the case of an increase in the required load of the compression-ignition internal combustion engine.

5. A method of controlling a compression-ignition internal combustion engine according to claim 1, wherein the alcohol has a carbon number of alkyl group of 3 or low and is any of methanol, ethanol, or propanol.

6. A method of controlling a compression-ignition internal combustion engine according to claim 5, wherein the alcohol is ethanol.

7. A method of controlling a compression-ignition internal combustion engine according to claim 1, wherein the liquid hydrocarbon is one or more types of liquid hydrocarbons selected from a group consisting of saturated hydrocarbon, unsaturated hydrocarbon, alicyclic hydrocarbon, and aromatic hydrocarbon.

8. A method of controlling a compression-ignition internal combustion engine according to claim 7, wherein the liquid hydrocarbon is gasoline.

9. A method of controlling a compression-ignition internal combustion engine according to claim 2, wherein the liquid mixture stored in the second tank is supplied to the compression-ignition internal combustion engine together with the blended fuel stored in the first tank or the liquid hydrocarbon stored in the second tank in the case of an increase in the required load of the compression-ignition internal combustion engine.

10. A method of controlling a compression-ignition internal combustion engine according to claim 3, wherein the liquid mixture stored in the second tank is supplied to the compression-ignition internal combustion engine together with the blended fuel stored in the first tank or the liquid hydrocarbon stored in the second tank in the case of an increase in the required load of the compression-ignition internal combustion engine.

* * * * *